United States Patent
Schmitz

(10) Patent No.: US 12,152,673 B2
(45) Date of Patent: Nov. 26, 2024

(54) HOUSING FOR MOTOR VEHICLE-RELATED USES

(71) Applicant: Kiekert AG, Heiligenhaus (DE)

(72) Inventor: Andreas Schmitz, Velbert (DE)

(73) Assignee: Kiekert AG, Heiligenhaus (DE)

( * ) Notice: Subject to any disclaimer, the term of this patent is extended or adjusted under 35 U.S.C. 154(b) by 191 days.

(21) Appl. No.: 17/997,562

(22) PCT Filed: Feb. 18, 2021

(86) PCT No.: PCT/DE2021/100162
§ 371 (c)(1),
(2) Date: Oct. 31, 2022

(87) PCT Pub. No.: WO2021/223791
PCT Pub. Date: Nov. 11, 2021

(65) Prior Publication Data
US 2023/0184333 A1  Jun. 15, 2023

(30) Foreign Application Priority Data
May 6, 2020 (DE) ..................... 10 2020 112 322.1

(51) Int. Cl.
*F16J 15/10* (2006.01)
*E05B 77/34* (2014.01)
*E05B 85/02* (2014.01)

(52) U.S. Cl.
CPC ............ *F16J 15/104* (2013.01); *E05B 77/34* (2013.01); *F16J 15/102* (2013.01); *E05B 85/02* (2013.01)

(58) Field of Classification Search
CPC .... F16J 15/00; F16J 15/02; F16J 15/46; F16J 15/48; F16J 15/10; F16J 15/102; F16J 15/104; F16J 15/106; E05B 77/00; E05B 77/34; E05B 83/00; E05B 83/14; E05B 85/00; E05B 85/02
USPC ......................................................... 292/216
See application file for complete search history.

(56) References Cited

U.S. PATENT DOCUMENTS

2013/0199103 A1 *  8/2013  Raschegewski ........ E05B 85/02
                                                           118/58

FOREIGN PATENT DOCUMENTS

| DE | 202011003361 U1 | 6/2012 |
| DE | 202012000931 U1 | 5/2013 |
| DE | 102016102835 A1 | 8/2017 |
| EP | 0709532 A1 | 5/1996 |
| EP | 2663424 A2 | 11/2013 |
| EP | 2663424 B1 | 1/2018 |

(Continued)

OTHER PUBLICATIONS

DE-202012000931-U1, Kiekert (Year: 2013).*
International Search Report mailed May 31, 2021, for priority International Patent Application No. PCT/DE2021/100162.

*Primary Examiner* — Nathan Cumar
(74) *Attorney, Agent, or Firm* — Renner, Otto, Boisselle & Sklar, LLP

(57) ABSTRACT

A housing for motor vehicle-related uses, which comprises at least one housing wall and at least one first sealing element connected to the housing wall for orienting and guiding a second sealing element made of a different material by comparison with the first sealing element. According to the invention the first sealing element is designed as at least one arm which yields resiliently relative to the housing wall. The arm supports the second sealing element on its surface remote from the housing.

11 Claims, 2 Drawing Sheets

(56) References Cited

FOREIGN PATENT DOCUMENTS

| JP | 2016033310 A | 3/2016 |
|---|---|---|
| JP | 2017150285 A | 8/2017 |

* cited by examiner

HOUSING FOR MOTOR VEHICLE-RELATED USES

This application is a national phase of International Patent Application No. PCT/DE2021/100162 filed Feb. 18, 2021, which claims priority to German Patent Application No. 10 2020 112 322.1 filed May 6, 2020, each of which is hereby incorporated herein by reference in its entirety.

FIELD OF DISCLOSURE

The invention relates to a housing for motor vehicle-related uses, comprising at least one housing wall and at least one first sealing element connected to the housing wall for aligning and guiding a second sealing element made of a different material by comparison with the first sealing element.

BACKGROUND OF DISCLOSURE

Due to their specific area of application, housings for motor vehicle-related uses are exposed to various environmental influences. These include not only strongly fluctuating temperatures, but in particular moisture, dust, and other dirt. In order to ensure safe and at the same time long-lasting functionality, the seals used in this context are of particular importance. Inevitable manufacturing tolerances must also be taken into account in this context.

Housings for motor vehicle-related uses are, by way of example and not by way of limitation, a lock cylinder for a motor vehicle door lock, as is described, for example, in EP 0 709 532 A1. In this case, a lock cylinder interior can be closed by a cover cap that is pivoted against the force of a return spring when a key shank is inserted into a key channel. A resilient seal closing the edge of the key channel opening is fastened to the cover cap. In the closed state of the cover cap, the sealing lip of said seal rests against the inside of the end cap. This is intended to reliably prevent dust, moisture, etc. from penetrating the key channel.

In addition, JP 2017-150285 A relates to a motor vehicle door latch with improved waterproofing. For this purpose, a housing is provided which is open in the direction of a latch mechanism.

An associated cover is used to close this opening and is equipped with a sealing arrangement which closes an associated gap. For this purpose, the sealing arrangement has a relatively complex structure and is correspondingly complicated to attach and manufacture.

EP 2 663 424 B1 relates to a method for applying a seal to a surface of a device housing for a motor vehicle. The surface of the housing is at least partially cleaned and microstructured by a heat source. A sealing compound is then immediately applied adhesively to the regions of the surface of the housing treated in this way. The microstructures promote adhesion of the sealing compound without the need for additional adhesion promoters. In this way, practically any seal shape can be implemented properly and with little effort.

In the generic state of the art according to JP 2016033310 A, the procedure is such that a door latch housing has an inner latch plate to prevent the ingress of water, which plate is additionally equipped with a reinforcing element as a sealing element. This is because the reinforcing element can be designed in the form of a channel overall and can accommodate a predominantly band-shaped seal made of rubber material, for example, inside the channel.

The state of the art has proven itself in principle; however, it still offers room for improvement. As a rule, door latches and associated housings are equipped with the foam seal on the outside, as is described in detail in EP 2 663 424 B1. With the help of the foam seal or the seal in general, a seal is provided between the latch housing and an associated motor vehicle door, to which the door latch is usually screwed. Since the motor vehicle door has an opening at least in the region of an inlet mouth of the motor vehicle door latch, the seal in question is of particular importance in order to prevent moisture as well as dirt from penetrating into the interior of the motor vehicle door via this opening and laterally between the motor vehicle latch or its housing and an inner door panel of the motor vehicle door. This must be prevented in order to continue to ensure the functional capability of units located inside the motor vehicle door, such as window regulators or side airbags.

Due to manufacturing tolerances in the opening position of the motor vehicle doors and/or the housing of the motor vehicle latches, the known foam seals have a relatively large thickness, which can be between 6 mm and 10 mm. Such a thickness compensates for the tolerances described above, which is only the case to a limited extent for rubber seals, as are also described in the state of the art.

Since the attachment of such a foam seal according to the teaching of EP 2 663 424 B1 typically requires a pretreatment of the surface of the housing equipped with the foam seal and a significant material requirement is observed due to the relatively large material thickness of the foam seal, significant production costs are to be expected. This is where the invention comes in.

SUMMARY OF DISCLOSURE

The invention is based on the technical problem of further developing such a housing for motor vehicle-related uses in such a way that in particular the mounting costs and possibly also the assembly costs are reduced compared to the state of the art.

To solve this technical problem, the invention proposes in a generic housing for motor vehicle-related uses that the first sealing element is designed as at least one arm which yields resiliently relative to the housing wall and supports the second sealing element on its surface remote from the housing.

Within the scope of the invention, the sealing element or, in general, the seal is still constructed in two parts, comparable to the generic state of the art according to JP 2016033310 A. In contrast to this, however, the first sealing element is designed as at least one arm which yields resiliently in relation to the housing wall and consequently represents a quasi-resilient base for the second sealing element. In principle, a plurality of arms and associated second sealing elements can also be implemented. Since the second sealing element is made of different materials compared to the first sealing element, the second sealing element can continue to primarily take over the sealing function. Due to the resilient base for this second sealing element realized with the help of the resiliently yielding arm, relatively large gaps can consequently be bridged according to the invention, without a particularly thick foam seal or rubber seal being required as the second sealing element in this context.

Rather, the first sealing element, which is designed as at least one resiliently yielding arm, primarily assumes the function of bridging the gap. As a result, in particular the material thickness of the second sealing element can be reduced compared to the state of the art, for example in accordance with EP 2 663 424 B1. With regard to the generic JP 2016033310 A, there is a particular advantage that large gap widths can be mastered in a structurally simple manner and can be perfectly sealed by the combination of the two sealing elements implemented according to the invention.

Within the framework of an advantageous embodiment, the resiliently yielding arm is designed in at least two parts with an arm stump connected to the housing wall and an arm wing supporting the second sealing element. The second sealing element is connected to the arm wing. In addition, the second sealing element is located on the surface of the arm wing remote from the housing and is consequently oriented outwards in relation to the housing wall, so that the desired sealing function is easily provided as a result.

The arm wing is generally oriented largely parallel to the longitudinal extent of the housing wall. As a result, when the housing wall is connected to a body component, for example, the arm wing can deviate resiliently and vertically in comparison to the surface described by the housing wall while bridging an associated gap. Since the arm wing also supports the second sealing element on its surface remote from the housing, the gap between the housing wall and the body or a body component is thereby perfectly sealed in the example described.

In this case, the design is usually still such that the arm wing is designed at a horizontal distance from the housing wall while forming a free region. The arm stump, possibly in conjunction with the arm wing, ensures that the dry region is sealed off from a wet region, as will be explained in more detail below in the exemplary embodiment.

The arm stump and the arm wing usually enclose an acute angle between them. As a result, the arm wing can easily deform resiliently in the direction of the housing wall when the housing is mounted on or in the associated motor vehicle body. This deformation is usually additionally promoted by the fact that the arm stump and the arm wing taken together have a V-shaped cross section. At the same time, the V shape expresses the fact that the wet region extends in the direction of the V limbs, whereas the two V limbs in the direction of their apex ensure that the dry region is sealed off from the wet region.

From a manufacturing point of view, it is advisable if the arm or the first sealing element and the housing wall are made of the same material. For example, the arm can be molded onto the housing wall. The invention recommends metal and in particular plastics material as conceivable materials for the housing. In the last-mentioned case, the arm can be molded onto the housing wall in a particularly advantageous manner, namely when the arm and the housing wall as a whole represent an injection-molded part made of plastics material. As a result, production is also particularly easy to implement and is associated with cost advantages.

The second sealing element is generally designed as an elastomer or elastomeric plastics material or as a foam seal. In principle, combinations are also conceivable. The elastomeric plastics material in question or the foam seal as the second sealing element can generally be molded onto the resiliently yielding arm or the first sealing element, specifically in the sense of a coextrusion process.

In general, however, the procedure is such that the second sealing element or the elastomer and/or foam seal is produced separately from the housing including the first sealing element or the molded resiliently yielding arm. At this point, it is advisable if the elastomer and/or foam seal in question is connected to the arm or the arm wing thereof, which is usually done with adhesive. In other words, the elastomer and/or foam seal is regularly glued to the arm wing or generally to the first sealing element. Of course, the foam seal can also be applied to the first sealing element or the arm wing, as is described in detail in EP 2 663 424 B1. In other words, in this case the arm wing is cleaned and microstructured on its surface remote from the housing using a heat source. The sealing compound is then applied adhesively to the regions of the surface treated in this way.

The sealing compound can be the previously mentioned elastomeric plastics material or elastomer or a foam plastics material as well as combinations thereof. In general, however, other connection techniques are also possible in this context, for example in such a way that the two plastics materials are welded together by the second sealing element on the one hand and the first sealing element on the other. This can be done by the action of heat (e.g., generated by a laser) or by ultrasound.

As a result, a housing for motor vehicle-related uses is provided, which can be fixed in particular on or in an associated motor vehicle body without any problems. In order to achieve the desired sealing effect, large gap widths can also be bridged due to manufacturing tolerances. All of this is possible taking into account reduced production costs, because, according to the invention, a significant saving in material is observed for the second sealing element. Because, in contrast to the state of the art, for example according to EP 2 663 424 B1, material thicknesses can be used at this point that are reduced from formerly 6 mm to 10 mm to, for example, 2 mm or even less for the second sealing element or the foam seal usually used at this point. This significantly reduces the material consumption for the foam seal. The same applies, of course, if the alternative elastomer seal is used instead of the foam seal. Herein lie the substantial advantages.

BRIEF DESCRIPTION OF DRAWINGS

The invention is explained in greater detail below with reference to drawings which show only one exemplary embodiment. In the drawings.

DETAILED DESCRIPTION

Figure 1:
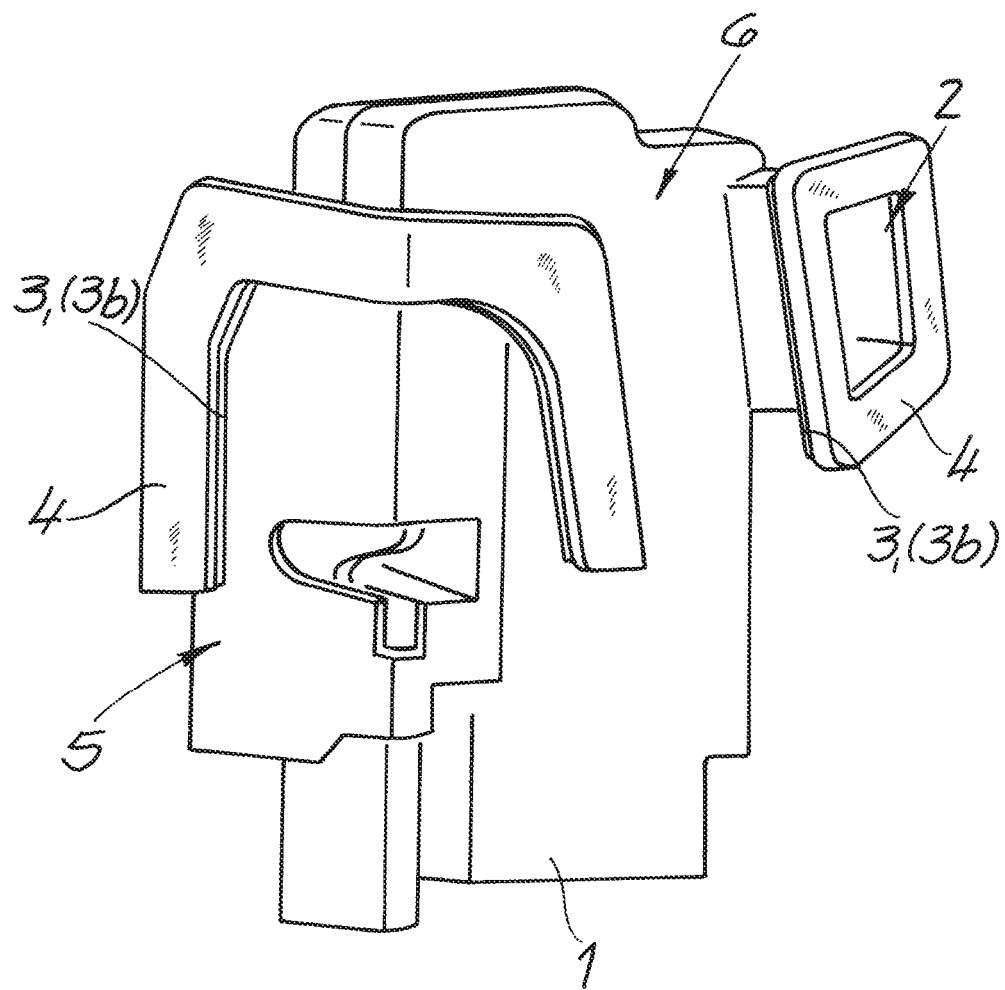
FIG. 1 shows an inventive housing for motor vehicle-related uses in the form of a motor vehicle latch housing and a connector housing, FIG. 2 schematically shows the object according to FIG. 1 in cross section in a first variant

A housing for motor vehicle-related uses is shown in the figures. In fact, the housing in question is a latch housing 1 on the one hand and a connector housing 2 on the other. In principle, however, completely different and deviating housing shapes can also be realized at this point. FIG. 1 shows that the latch housing 1 there is equipped with a seal, which is formed essentially in two parts with a first sealing element 3 and a second sealing element 4. With the help of the seal realized in this way on the latch housing 1, the latch housing 1 can be fixed inside a motor vehicle door (not shown). The seal generally ensures that a dry region 5 is separated from a wet region 6.

In detail, the first sealing element 3 is connected to a housing wall 1a as part of the housing or latch housing 1. In general, the first sealing element 3 can also be connected to a housing wall 2a of the connector housing 2. In addition, the first sealing element 3 ensures alignment and guidance of the second sealing element 4. The second sealing element 4 is made of a different material than the first sealing element 3.

Figure 2:
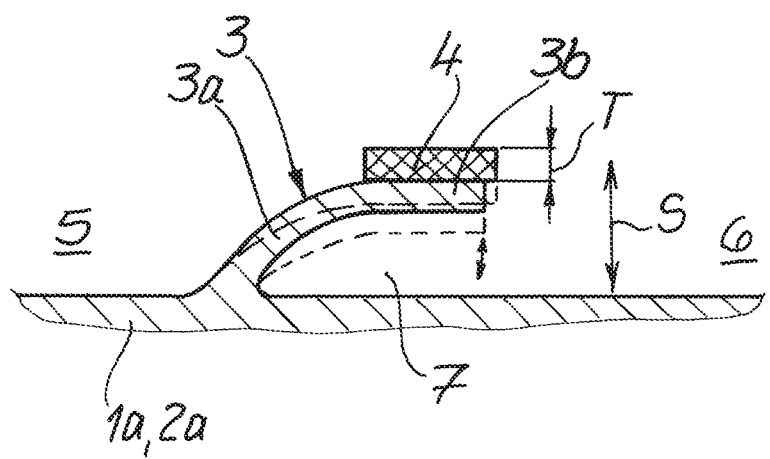
Figure 3:
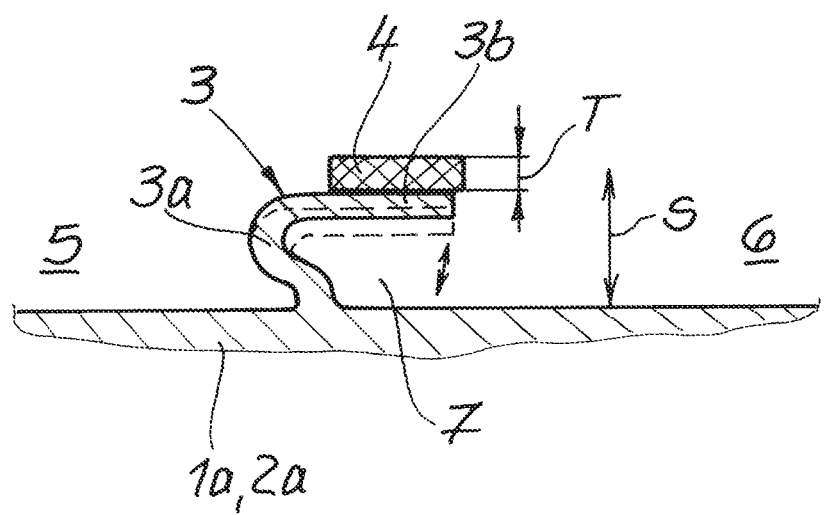
FIG. 3 shows the object of FIG. 2 in another modified variant.

In fact, the first sealing element 3 according to the exemplary embodiment and as shown in FIGS. 2 and 3 is formed onto the housing wall 1a or 2a. In other words, the first sealing element 3 and the housing wall 1a or 2a are made of the same material and, according to the exemplary embodiment, are made of plastics material. The plastics material for the housing wall 1a or the housing 1 and the first sealing element 3 is typically a thermoplastic, for example POM (polyoxymethylene). The same applies to the connector housing 2. In contrast, the second sealing element 4 is made of a different material. This is typically an elastomeric plastics material and/or a foam plastics material, for example one based on PUR (polyurethane).

From a structural point of view, it is possible to recognize, in particular when comparing the sectional views according to FIGS. 2 and 3, that the first sealing element 3 is designed as at least one arm 3 which yields resiliently relative to the housing wall 1a, 2a. The resiliently yielding arm 3 supports the second sealing element 4 on its surface remote from the housing. In fact, the second sealing element 4 is, for example, glued onto this surface remote from the housing, specifically in the manner already described in the introduction. For this purpose, the surface of the first sealing element 3 remote from the housing may first be cleaned and microstructured with a heat source that is limited in terms of area, with the sealing compound defining the second sealing element 4 then being adhesively applied to the regions of the surface treated in this way.

According to the exemplary embodiment, the resiliently yielding arm or the first sealing element 3 is designed in two parts overall. In fact, the resiliently yielding arm or the first sealing element 3 has an arm stump 3a connected to the housing wall 1a, 2a and an arm wing 3b connected to the arm stump 3a and supporting the second sealing element 4. The arm wing 3b is largely oriented parallel to the longitudinal extent of the housing wall 1a.

In addition, one can see from the sectional views in FIGS. 2 and 3 that the arm stump 3a and the arm wing 3b enclose an acute angle between them. In this way, the arm stump 3a and the arm wing 3b are assembled and formed into a V-shape in cross section. As a result of this, the arm wing 3b is spaced horizontally relative to the housing wall 1a, 2a, and a free region 7 is defined at this point.

The arm wing 3b can move into this free region 7 when mounting the latch housing 1 on the motor vehicle door (not shown) as shown by the corresponding arrows in FIG. 2 and by the mounting position reached thereby in the embodiment shown in dashed lines. In this assembly, the procedure is also such that the arm stump 3a, which is overall V-shaped in cross section, and the arm wing 3b are open in the direction of the wet region 6. In other words, an apex of the V-shape points in the direction of the dry region 5, so that the combined effect of the first sealing element 3 in conjunction with the second sealing element 4 ensures that, starting from the wet region 6, neither dust nor moisture can get into the dry region 5.

A design that is comparable to that described above can also be implemented in the connector housing 2. In this case, instead of the housing wall 1a, a corresponding housing wall 2a of the connector housing 2 is designed accordingly, as is expressed in particular in the sectional views according to FIGS. 2 and 3. In both cases, a gap S is bridged and closed overall with the aid of the first sealing element 3 in conjunction with the second sealing element 4. The second sealing element 4 has a material thickness T that is significantly smaller than the width of the gap S, or is only a maximum of 30% or 20% of the width of the gap S.

| List of reference signs | | | |
|---|---|---|---|
| 1, 2 | Housing | 1 Latch housing | 2 Connector housing |
| 1a, 2a | Housing wall | | |
| 3 | Yielding arm/first sealing element | | |
| 3a | Arm stump | 3b Arm wing | |
| 4 | Sealing element/second sealing element | | |
| 5 | Dry region | | |
| 6 | Wet region | | |
| 7 | Free region | | |
| S | Gaps | | |
| T | Material thickness | | |

The invention claimed is:

1. A housing for motor vehicle-related uses comprising:
a housing wall, a first sealing element, and a second sealing element, wherein the first sealing element is connected to the housing wall for aligning and guiding the second sealing element, the second sealing element being made of a different material from the first sealing element,
wherein the first sealing element has a resiliently yielding arm which yields resiliently relative to the housing wall and supports the second sealing element on a surface of the resiliently yielding arm remote from the housing,
wherein the resiliently yielding arm has two parts including an arm stump connected to the housing wall and an arm wing supporting the second sealing element, and
wherein the arm stump and the arm wing enclose an acute angle between them.

2. The housing according to claim 1, wherein the arm wing is oriented parallel to a longitudinal extent of the housing wall.

3. The housing according to claim 1, wherein the arm wing is positioned at a horizontal distance from the housing wall to form a free region between the housing wall and the arm wing.

4. The housing according to claim 1, wherein the arm stump and the arm wing taken together have a V-shaped cross section.

5. The housing according to claim 1, wherein the resiliently yielding arm and the housing wall are made of a same material.

6. The housing according to claim 5, wherein the resiliently yielding arm is molded onto the housing wall.

7. The housing according to claim 6, wherein the resiliently yielding arm and the housing wall are formed as an injection-molded part made of a plastics material.

8. The housing according to claim 1, wherein the second sealing element is at least one of an elastomer and a foam seal.

9. A housing for motor vehicle-related uses comprising:
a housing wall, a first sealing element, and a second sealing element, wherein the first sealing element is connected to the housing wall for aligning and guiding the second sealing element, the second sealing element being made of a different material from the first sealing element,
wherein the first sealing element has a resiliently yielding arm which yields resiliently relative to the housing wall and supports the second sealing element on a surface of the resiliently yielding arm remote from the housing, wherein the resiliently yielding arm has two parts including an arm stump connected to the housing wall and an arm wing supporting the second sealing element, and wherein the arm stump and the arm wing taken together have a V-shaped cross section.

10. A housing for motor vehicle-related uses comprising:

a housing wall, a first sealing element, and a second sealing element, wherein the first sealing element is connected to the housing wall for aligning and guiding the second sealing element, the second sealing element being made of a different material from the first sealing element, wherein the first sealing element has a resiliently yielding arm which yields resiliently relative to the housing wall and supports the second sealing element on a surface of the resiliently yielding arm remote from the housing, wherein the resiliently yielding arm and the housing wall are made of a same material, and wherein the resiliently yielding arm is molded onto the housing wall.

11. The housing according to claim 10, wherein the resiliently yielding arm and the housing wall are formed as an injection-molded part made of a plastics material.

* * * * *